United States Patent [19]

Sunstein

[11] 3,891,837

[45] June 24, 1975

[54] DIGITAL LINEARITY AND BIAS ERROR COMPENSATING BY ADDING AN EXTRA BIT

[76] Inventor: Drew E. Sunstein, 19 Parkhurst Dr., Nashua, N.H. 03060

[22] Filed: July 3, 1972

[21] Appl. No.: 268,589

[52] U.S. Cl. .................................. 235/152; 235/164
[51] Int. Cl. .............................................. G06f 7/38
[58] Field of Search...... 340/347 DD; 235/152, 156, 235/159, 160, 164, 168, 173, 174, 175, 176

[56] References Cited

UNITED STATES PATENTS 3,631,471 12/1971 Griffiths ....................... 340/347 DD
3,699,326 10/1972 Kindell et al. ...................... 235/175

OTHER PUBLICATIONS

R. K. Richards, Arithmetic Operations in Digital Computers, 1955, pp. 174–76.
Y. Chu, Digital Computer Design Fundamentals, 1962, pp. 48–50.

*Primary Examiner*—David H. Malzahn
*Attorney, Agent, or Firm*—Charles Hieken, Esq.; Jerry Cohen, Esq.

[57] ABSTRACT

Bias error is reduced in binary number signals by representing a binary signal having N bits as having N+1 bits with the least significant bit always being ONE, whereby this representation offsets to reduce error.

8 Claims, 5 Drawing Figures

DIGITAL LINEARITY AND BIAS ERROR COMPENSATING BY ADDING AN EXTRA BIT

BACKGROUND OF THE INVENTION

The present invention relates to methods and means for compensating for linearity and bias error in digital systems. The invention applies techniques free from complexity to solve this problem with relatively inexpensive additional apparatus.

When digital signals representative of analogue values are arithmetically combined, in the absence of special techniques, there are nonlinearities and bias errors through zero crossings. In a system having an a/d converter with a threshold at zero, the output code from the converter generally includes values of "± 0", or their equivalents. Prior art techniques eliminate this double zero in a number of ways.

1. Add "$1_{10}$" to each positive code;
2. subtract "$1_{10}$" from each negative code;
3. do both "1" and "2".

Methods "1" and "2" produce a bias error of ½ bit, and if the thresholds in the a/d converter are adjusted to compensate for this, zero crossings are no longer detected. Method 3 produces a nonlinearity of two unit steps (instead of one unit step) when crossing zero.

Accordingly, it is an important object of this invention to eliminate linearity and bias errors of the type described above.

It is a further object of the invention to achieve the preceding object with techniques free from complexity.

It is a further object of the invention to achieve one or more of the preceding objects with relatively little additional apparatus.

It is a further object of the invention to achieve the preceding object with the additional apparatus being relatively inexpensive.

SUMMARY OF THE INVENTION

According to the invention, a signal representative of one-half the least significant bit is algebraically combined with the digital number signals, preferably by appending an extra bit to a digital number signal thus modified at a position of immediately lesser significance than the least significant digit in the number signal. Numerous other features, objects and advantages of the invention will become apparent from the following specification when read in connection with the accompanying drawing in which:

DETAILED DESCRIPTION OF PREFERRED EMBODIMENTS

Figure 1:
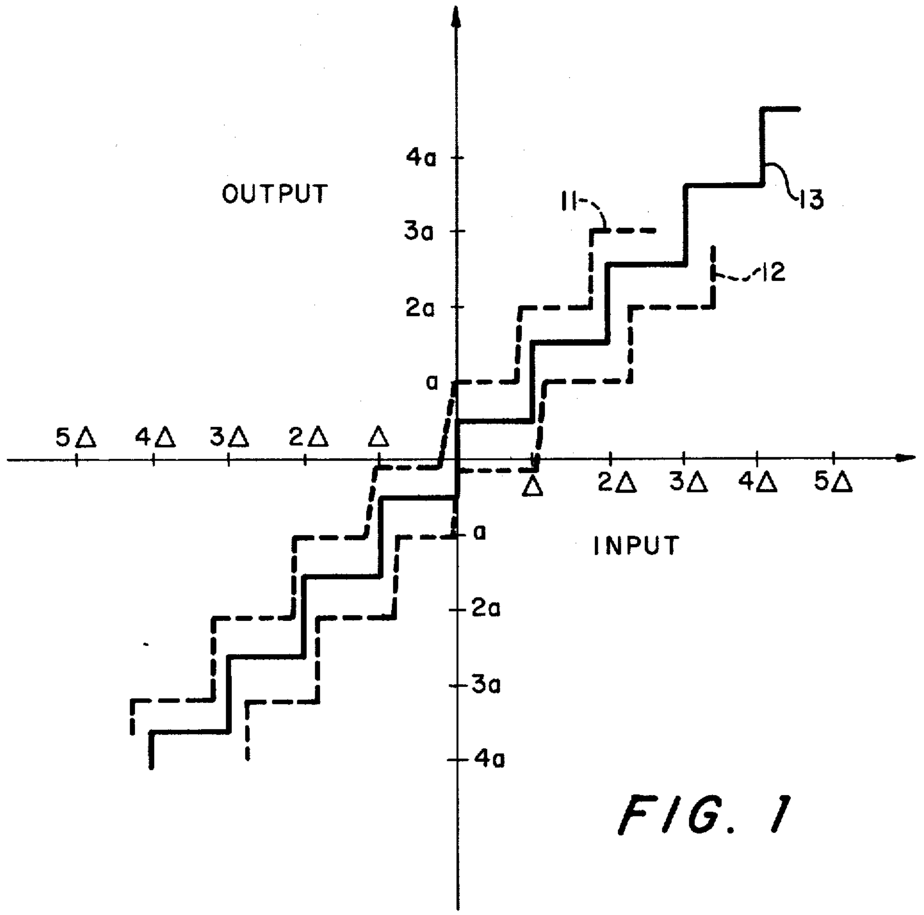
FIG. 1 illustrates quantized values as a function of the input to illustrate how the invention solves the problem.

With reference to the drawing and more particularly FIG. 1 thereof, there is shown a graphical representation of output quantization levels as a function of input signal levels. The broken lines have been slanted slightly because they would otherwise be obscured by the solid lines, it being understood that portions of the broken lines overlap the solid lines. It is convenient to define the input signal values into a number of multiples of an amplitude Δ that may assume positive and negative values and the output into a number of equally spaced digital numbers representing the input quantized. Conventionally an input greater than zero and less than Δ is encoded as "+0" while a value less than zero and greater than −Δ is encoded as "−0", or equivalents of these values. Curve 11 shows one approach to eliminating this double zero by adding $1_{10}$ to each positive code. Curve 12 shows another prior art approach of subtracting $1_{10}$ from each negative code. Curve 11 produces a bias error of +½ and curve 12 produces a bias error of −½, and if the thresholds in the a/d converter are adjusted to compensate for this bias, zero crossings are no longer detected. If curves 11 and 12 are combined in accordance with a third approach to eliminating the double zero, there is a nonlinearity of two unit steps (instead of one unit step) when crossing zero.

Curve 13 represents the input-output relationship achieved with the present invention. Each step is a unit increment, there is no bias error and zero crossings are preserved. This is accomplished by algebraically combining "$½_{10}$" with all positive and negative codes. This result can readily be implemented by appending an extra bit to the digital signal of interest. For example, 10111 becomes 10111.1.

This result will be better understood from the following example. Consider the decimal number representation of the three bit binary numbers from 000 to 111 including the first as a polarity bit. These binary numbers may be interpreted according to various conventional numbering systems −3, −2, −1, −0, 0, 1, 2, 3; or −3, −2, −1, 0, 1, 2, 3, 4; or −4, −3, −2, −1, 0, 1, 2, 3. The first group is conventional ones complement. The second group corresponds to two's complement biased up one represented by curve 11; the third group, to two's complement represented by curve 12.

By appending an extra low order bit in accordance with the invention, the binary numbers become 000.1, 001.1, 010.1, . . . 111.1. In 2's complement, these numbers become −3½, −2½, −1½, −½, ½, 1½, 2½, and 3½, corresponding to curve 13. Note that the difference between adjacent steps equals 1, there is no bias error and even zero crossings alone contain useful nonzero values. Still another feature of the invention is that the extra bit need not be stored or carried with the data. It is always a "1", and is only appended for numerical calculations. This technique can be used with digital number signals in a variety of applications of any bit length.

The invention is also useful in avoiding truncation bias errors. Truncation of low order bits is functionally equivalent to setting those bits to zero. For both 1's complement and 2's complement numbers, this is rounding down as distinguished from rounding toward zero. A sizeable bias error can result from many operations which include a truncation. To compensate for this error a low order 1 can be appended to the number after each truncation in accordance with the principles of the invention. For example, consider a binary number with bits on both sides of the decimal point and truncate all low order bits to the right of the decimal. This rounds the number down. The "N" bits that were dropped could have assumed any value between zero and $1-2^{-N}$. For large N and many truncations, the expected value for these bits is one-half. Appending a 1 to the right of the decimal adds this one-half, and thus compensates for the truncation bias. This extra bit need not be stored or carried with the data and is appended before additional calculations.

Figure 2:
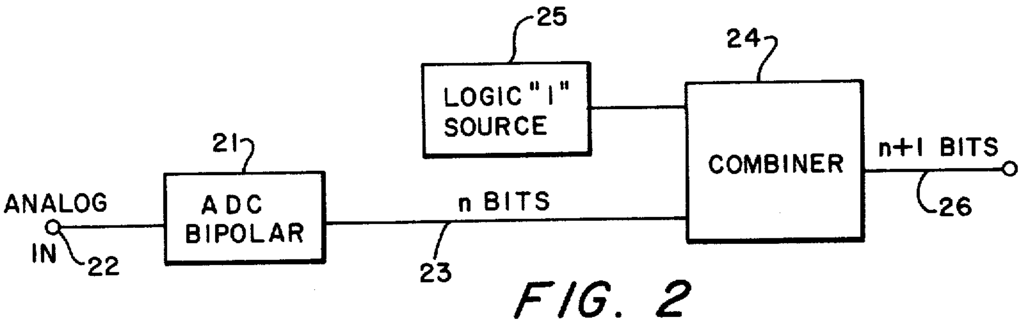
FIG. 2 is a block diagram illustrating the logical arrangement of a system that avoids the problem in analogue-to-digital conversion.

Referring to FIG. 2, there is shown a block diagram illustrating the logical arrangement of a system according to the invention. Bipolar analog-to-digital converter 21 converts the input analogue signal on terminal 22 into an N bit digital output signal on output 23 that is combined by combiner 24 with a logic 1 signal from source 25 to provide on output 26 a digital signal having N+1 bits with the least significant digit logical 1. The signal on line 26 may then be arithmetically combined with other digital signals, and at the conclusion of the arithmetical operation, this added least significant bit may be discarded.

Figure 3:
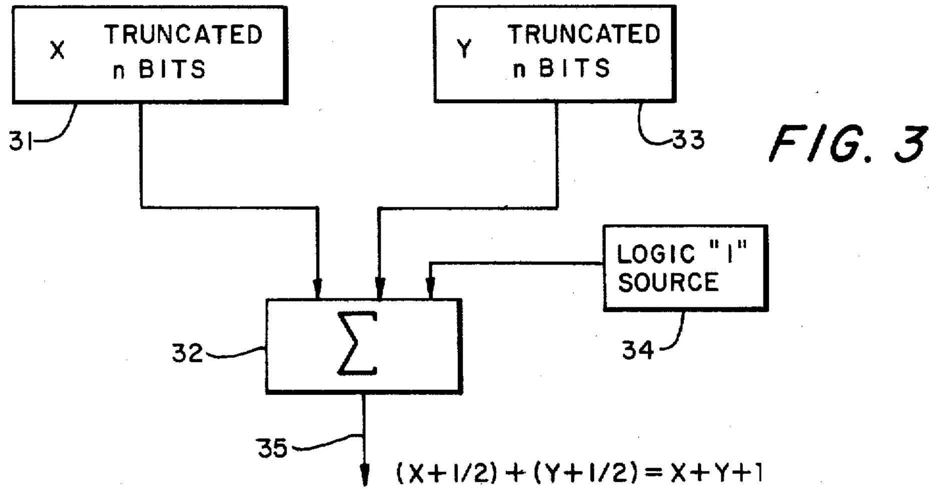
FIG. 3 is a block diagram illustrating the logical arrangement of an adder embodying the invention.

Referring to FIG. 3, there is shown a block diagram illustrating the logical arrangement of a system for combining truncated digital signals. A source 31 of an X truncated signal of *n* bits is applied to one input of adder 32. A source 33 of a Y truncated signal of *n* bits is applied to a second input of adder 32. A logic 1 source 34 provides a 1 signal to another input of adder 32 so that the output 35 of adder 32 carries N+1 bits representing the adjusted sum of X and Y, $(X + ½) + (Y + ½) = X + Y + 1$.

Figure 4:
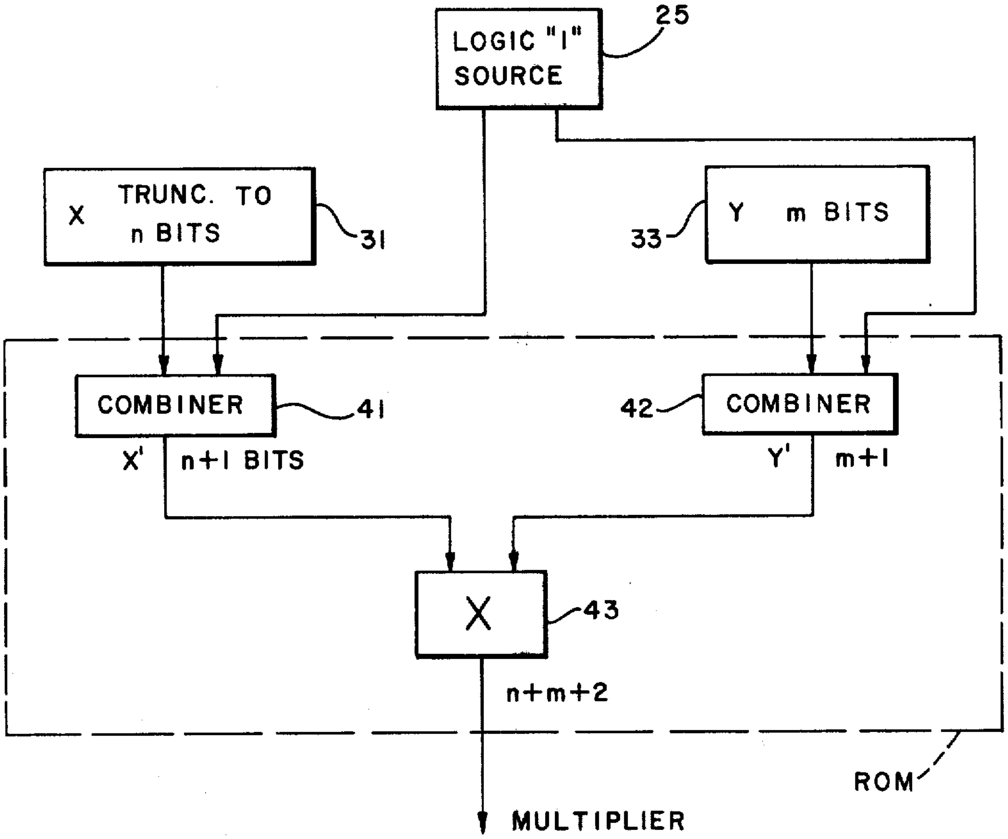
FIG. 4 is a block diagram illustrating the logical arrangement of a multiplier embodying the invention.

Referring to FIG. 4, there is a block diagram illustrating the logical arrangement of a multiplier according to the invention. Sources 31 and 33 provide X and Y signals, respectively, truncated to *n* and *m* bits, respectively, and applied to combiners 41 and 42, respectively. Logic 1 source 25 provides logic 1 levels to combiners 41 and 42. Combiners 41 and 42 provide X' and Y' signals, respectively, corresponding to the truncated X and Y signals, respectively, with the addition of a logic 1 in the least significant digit place, and are multiplied by multiplier 43 to provide an output signal of $n + m + 2$ bits for arithmetical combination with other digital signals. After truncation the least significant digit need not be stored.

The invention is also useful in scaling, preferably first appending logic 1 and then scaling the signal thus modified by the desired factor.

The invention is also useful in inverting (multiplying by −1). First complement the original number and then append logic 1.

Figure 5:
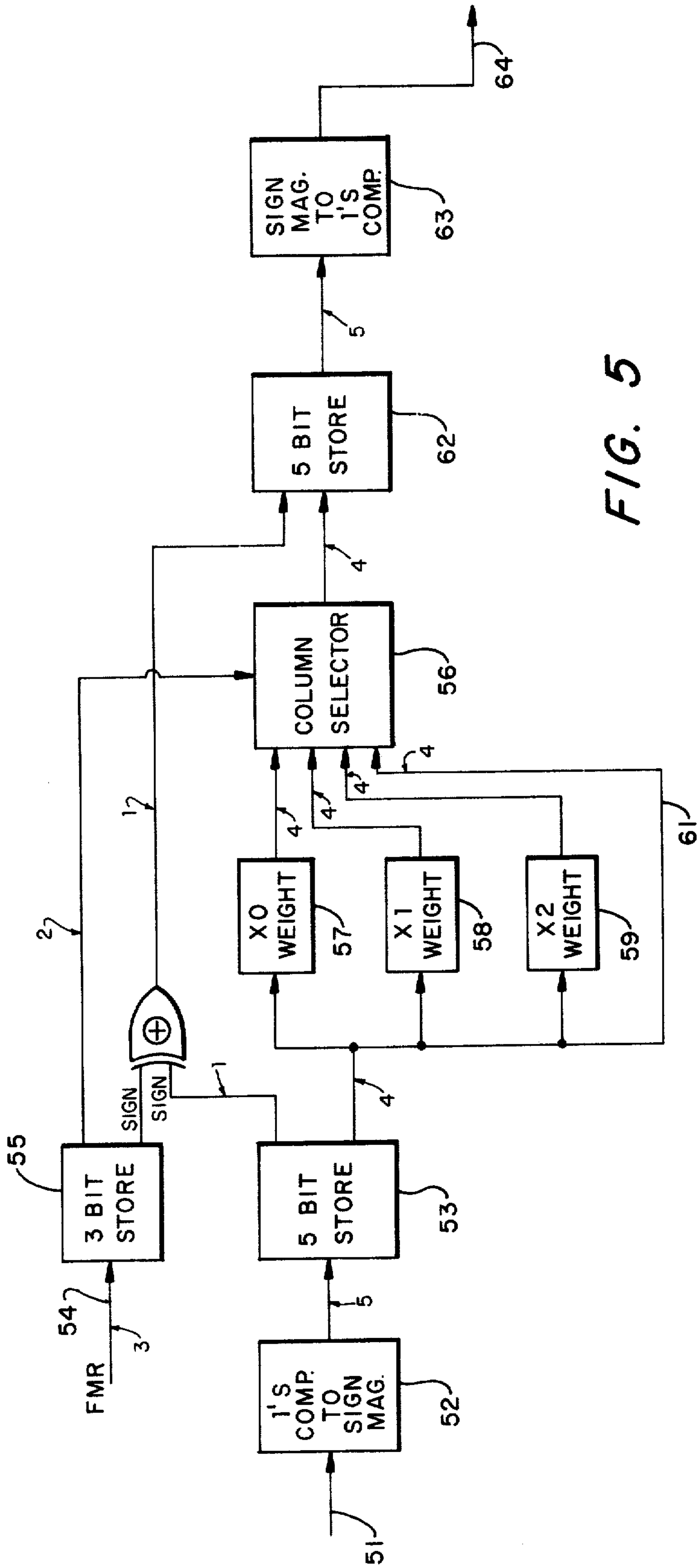
FIG. 5 is a block diagram illustrating the logical arrangement of a correlator according to the invention.

Referring to FIG. 5, there is shown the logical arrangement of a specific embodiment of the invention for performing correlation according to the map in the following table:

| Output Sign | | | | | Reference | | | | | | | Reference | | | | |
|---|---|---|---|---|---|---|---|---|---|---|---|---|---|---|---|---|
| | | | | | 0 | 1 | 2 | 3 | | | | 0 | 1 | 2 | 3 | |
| | | | | 0 | 0 | 0 | 0 | 0 | | | 9 | 1 | 3 | 6 | 9 | |
| $S_i$ | $S_r$ | | | 1 | 0 | 0 | 0 | 1 | O | | 10 | 1 | 4 | 7 | 10 | O |
| | 0 | 1 | I | 2 | 0 | 1 | 2 | 2 | u | I | 11 | 1 | 4 | 7 | 11 | u |
| 0 | 0 | 1 | n | 3 | 0 | 1 | 2 | 3 | t | n | 12 | 1 | 5 | 9 | 12 | t |
| 1 | 1 | 0 | p | 4 | 0 | 2 | 3 | 4 | p | p | 13 | 1 | 5 | 9 | 13 | p |
| | | | u | 5 | 0 | 2 | 3 | 5 | u | u | 14 | 2 | 6 | 10 | 14 | u |
| $S_i$ | + | $S_r$ | t | 6 | 1 | 3 | 5 | 6 | t | t | 15 | 2 | 6 | 10 | 15 | t |
| | | | | 7 | 1 | 3 | 5 | 7 | | | | | | | | |
| | | | | 8 | 1 | 3 | 6 | 8 | | | | | | | | |

-Continued

This mapping was consistent with the following considerations:

1. The mapping should resemble analog multiplication as closely as possible.
2. The output should change linearly when either the reference or the data changes linearly.
3. The input is a five-bit number in 1's complement, corresponding to a range in voltage of an analog signal.
4. A full scale input signal mixed with a full scale reference should yield a full scale output.

To this end the correlator of FIG. 5 implements the above table and includes matrix means for assigning each input number a weight corresponding to the mean of its range, that is to say, effectively appending a logical 1 after the least significant bit. The reference is similarly weighted and products computed. After normalizing the products, they are reassigned a five bit 1's complement number, using the same range map as for the input.

An input signal on line 51 is converted from 1's complement to sign and magnitude to provide a five bit signal that is transferred to five bit store 53. Note that five bit store 53 contains a sign bit, and four magnitude bits. The appended bit need not be stored. A reference signal is applied on reference input 54 to three bit store 55 having two magnitude bits and a sign bit. Column selector 56 then responds to the weighted signals provided by the row generator comprising weighting circuits 57, 58, 59, and 61, and the magnitude bits provided by three bit store 55 to provide an output signal. This output signal is stored in five bit store 62 and inversely converted from sign magnitude to 1's complement by converter 63 for delivery on output line 64 having five bits.

There has been described novel apparatus and techniques facilitating elimination of linearity and bias errors around zero. It is evident that those skilled in the art may now make numerous uses and modifications of and departures from the specific embodiments described herein without departing from the inventive concepts. Consequently, the invention is to be construed as embracing each and every novel feature and novel combination of features present in or possessed by the apparatus and techniques herein disclosed and limited solely by the spirit and scope of the appended claims.

What is claimed is:

1. Apparatus for bias error reduction in quantized number signals represented by first and second binary digits comprising, a source of a first digital signal having N bits representing a quantity and having bias error, a source of at least another digital signal, means for representing said first digital signal as having N+1 bits with the least significant bit thereof always corresponding to the nonzero one of said two binary digits, whereby this representation introduces an offset to reduce said bias error, and means for combining the first digital signal represented as having N+1 bits by said means for representing with at least said another digital signal to produce a result signal with reduced bias error.

2. Apparatus for error reduction in accordance with claim 1 with said means for representing comprising, a source of an appended digit signal representative of said nonzero one of the two binary digits, and means for combining said digital signal having N bits with said appended digit signal to provide said digital signal having N+1 bits.

3. Apparatus for error reduction in accordance with claim 2 wherein said source of another digital signal comprises, a source of a digital signal having M bits, means for combining said digital signal having M bits with said appended digit signal to provide a digital signal having M+1 bits with the least significant bit thereof always corresponding to said nonzero binary digit, and said means for combining comprises means for algebraically combining said digital signal having N+1 bits with said digital signal having M+1 bits.

4. Apparatus for error reduction in accordance with claim 3 wherein said means for algebraically combining comprises means for multiplying said digital signal having N+1 bits with said digital signal having M+1 bits to provide a digital product signal having M+N+2 bits.

5. Apparatus for error reduction in accordance with claim 1 with said means for representing comprising, a source of an appended digit signal representative of said nonzero one of the two binary digits, said source of said first digital signal having N bits comprising analog-to-digital conversion means whereby said digital signal is representative of an analog signal applied to said conversion means, and means for combining said first digital signal having N bits with said appended digit signal to provide said digital signal having N+1 bits.

6. Apparatus for error reduction in accordance with claim 1 wherein said means for representing comprises matrix means responsive to said digital signal having N bits for providing said digital signal having N+1 bits.

7. A method of reducing bias error in quantized number signals represented by zero and nonzero digits which method includes algebraically combining a digital number signal of N bits having bias error with a signal representative of one-half the largest nonzero value of the least significant digit place of the digital number to represent said digital number signal of N bits as having N+1 bits with the least significant bit thereof one-half said largest nonzero value, whereby this representation of said digital number signal of N bits as having N+1 bits with the least significant bit thereof one-half said largest nonzero value introduces offset to reduce said bias error, and combining said digital number signal thus represented as having N+1 bits with the least significant bit thereof one-half said largest nonzero value with at least another digital number signal to produce a result signal with reduced bias error.

8. A method of reducing errors in accordance with claim 7 wherein said digital number represented as having N+1 bits is binary and said least significant bit always corresponds to binary ONE.

* * * * *